Jan. 17, 1939.　　　　H. A. SOMMERS　　　　2,144,348
VEHICLE FOR SHIPPING SOLID CARBON DIOXIDE
Filed March 20, 1936　　　3 Sheets—Sheet 1
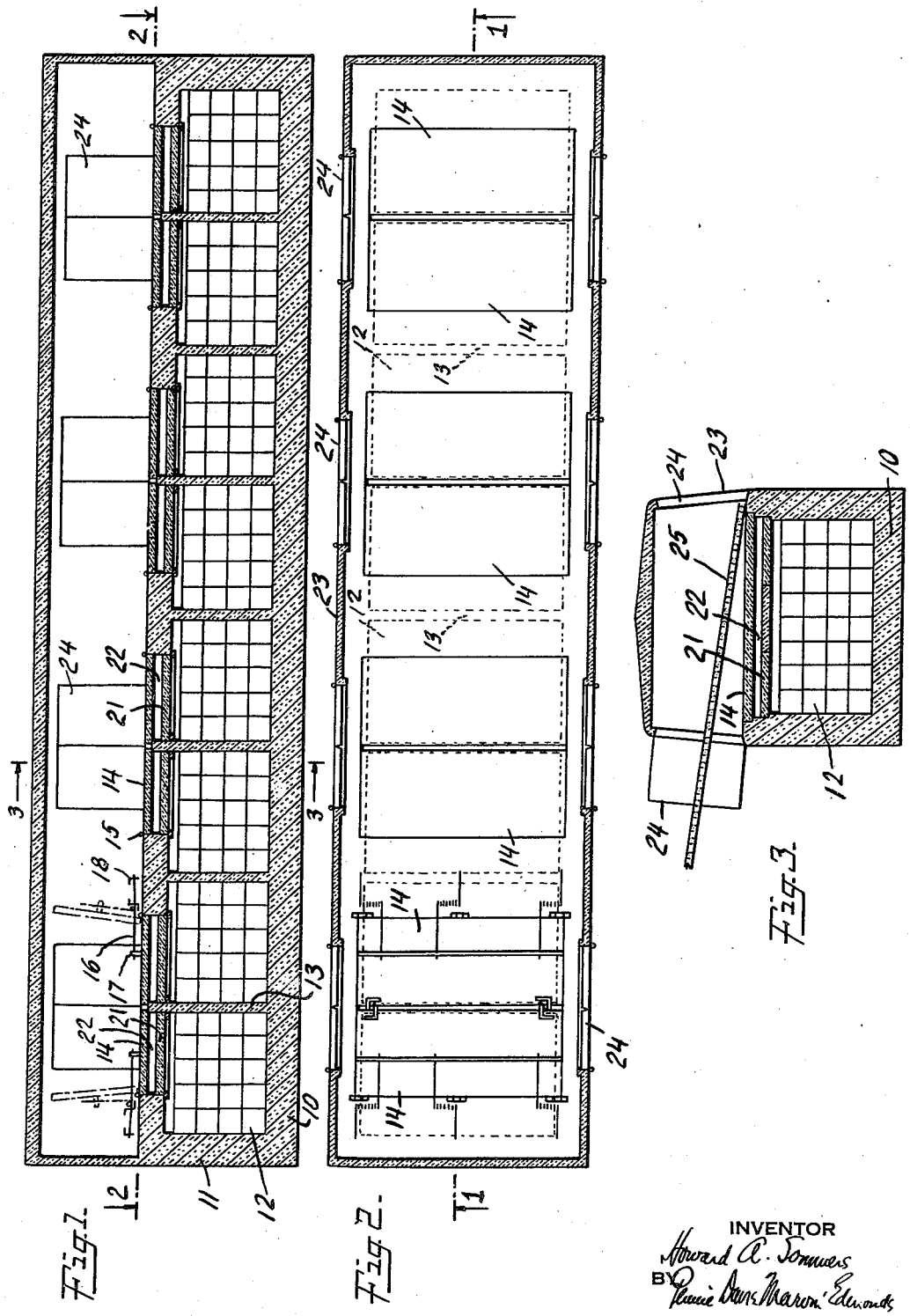

Jan. 17, 1939.  H. A. SOMMERS  2,144,348
VEHICLE FOR SHIPPING SOLID CARBON DIOXIDE
Filed March 20, 1936   3 Sheets-Sheet 2

Jan. 17, 1939. H. A. SOMMERS 2,144,348
VEHICLE FOR SHIPPING SOLID CARBON DIOXIDE
Filed March 20, 1936 3 Sheets-Sheet 3

INVENTOR
Howard A. Sommers
BY
Pennie Davis Marvin Edmonds
ATTORNEYS

Patented Jan. 17, 1939

2,144,348

UNITED STATES PATENT OFFICE 2,144,348

VEHICLE FOR SHIPPING SOLID CARBON DIOXIDE

Howard A. Sommers, Saltville, Va., assignor to The Mathieson Alkali Works, Inc., New York, N. Y., a corporation of Virginia Application March 20, 1936, Serial No. 69,767

6 Claims. (Cl. 62—91.5)

This invention relates to the transportation of refrigerants, specifically solid carbon dioxide, and is concerned more particularly with a novel vehicle or car body especially suited for the storage and shipment of that material, the body being so constructed as to permit rapid and easy loading and unloading while keeping loss of its contents at a minimum both during these operations and while it is in transit.

As is well known, solid carbon dioxide sublimes at a temperature of about −109° F., and because of that, it must be kept in heavily insulated chambers in order to protect it as much as possible against loss. At the sublimation temperature, the gas evolved is about twice as heavy as air at ordinary temperatures, and, because of its extreme cold and dryness, is an excellent insulating medium. Accordingly, in the transportation and storage of solid $CO_2$, it is desirable that an atmosphere of the gas be preserved in contact with the solid to the utmost extent possible by preventing escape of the gas from the storage chamber and the consequent infiltration of relatively warm air.

The preservation of the gaseous atmosphere in the chamber presents a difficult problem because it is practically impossible to construct heavily insulated doors or other closures for the chamber which will remain gas-tight and not freeze shut. This difficulty is increased in the case of a vehicle, such as a railroad car, by the shocks and jars incident to transit, which produce a weaving motion of the car tending to permit leakage of the gas through the closures. Escape of the gas into the insulation of the chamber walls is also detrimental, because the insulation becomes saturated with moisture and loses its original efficiency. Accordingly, the best results are obtained by constructing the storage chamber of relatively thick insulation of a self-sustaining character, and making the chamber gas-tight at the bottom and sides. For these purposes, the chamber wall is built up of layers of suitable insulation and is lined with sheet metal or with canvas or similar cloth suitably treated, as by being coated with asphalt. The chamber is then provided with insulated closures at the top, and with that construction, gas can escape only through the top. The solid $CO_2$ blocks at the top of the chamber are then continuously bathed by the cool gaseous $CO_2$, and this protects the material at the top of the chamber and tends to produce a more uniform temperature throughout the chamber. If such an assembly is not too rigid and is capable of adapting itself to the strains set up by the twisting and vibration of the car in service, the chamber is of the type found to be most satisfactory in practice.

A further feature which must be taken into account in the construction of a vehicle or car body for the shipment and storage of solid carbon dioxide is the facility with which the material can be loaded or unloaded. At the present time, it is customary to load the cars at a central production plant from which they are delivered to distribution points at which the solid $CO_2$ is kept in storage in the cars and sold directly therefrom. If these operations are carried on in a relatively short period of time, such as eight hours or less, it is not particularly important to have the car body subdivided into a large number of chambers or compartments, although two such chambers are preferably employed. But if the car is to be loaded over a substantial period, such as a day or more, and is used for storage at its destination with the unloading taking place over a day or more, it is highly important that the body be subdivided into a considerable number of compartments, so that only a relatively small portion of the lading will be exposed to the atmosphere at any particular time.

Solid carbon dioxide is now commonly produced and distributed in cubical blocks of about 10″ on a side, and, since the dimensions of a railroad car for the shipment of such material are determined by tunnel clearances, curvatures of the road bed, etc., the compartments in the car should be constructed so that they will hold the maximum quantity of the solid $CO_2$ blocks, and at the same time, be within the limitations on car size. Also, these compartments must be arranged on the car structure in such a way that the load is properly distributed, and the height of the compartments must be such that a workman of ordinary height may stand within a compartment and still have his head above the top.

The present invention is, accordingly, directed to the provision of a vehicle or car body which fulfills the conditions above set forth, and provides an efficient means for the transportation and storage of solid carbon dioxide. The new car body has a plurality of heavily insulated compartments or chambers with top openings, the solid refrigerant in the chambers is highly accessible and only a small portion of the lading need be exposed at any one time, and the compartments are so arranged that the available space within the body is used to best advantage. The compartments are lined so as to be gas-tight, and the top openings are closed by thick masses of insulation, but only a part of this insulation is included in the hinged closures or doors. The doors are thus not excessively heavy, and their tendency to freeze shut is reduced. The compartments are distributed along the frame of the car body and terminate considerably below the top of the body. Access to the compartments is then provided by a plurality of doors on the body, these doors extending downward from the body top to the top of the compartments, and being disposed opposite the compartment doors.

For a better understanding of the invention, reference may be had to the accompanying drawings, in which Figure 1 is a longitudinal section of the new vehicle body on the line 1—1 of Figure 2, certain features being conventionally illustrated;

Figure 2 is a similar sectional view, but on the line 2—2 of Figure 1;

Figure 3 is a similar sectional view on the line 3—3 of Figure 1, and showing the use of a conveyor for loading the car;

Figure 4:
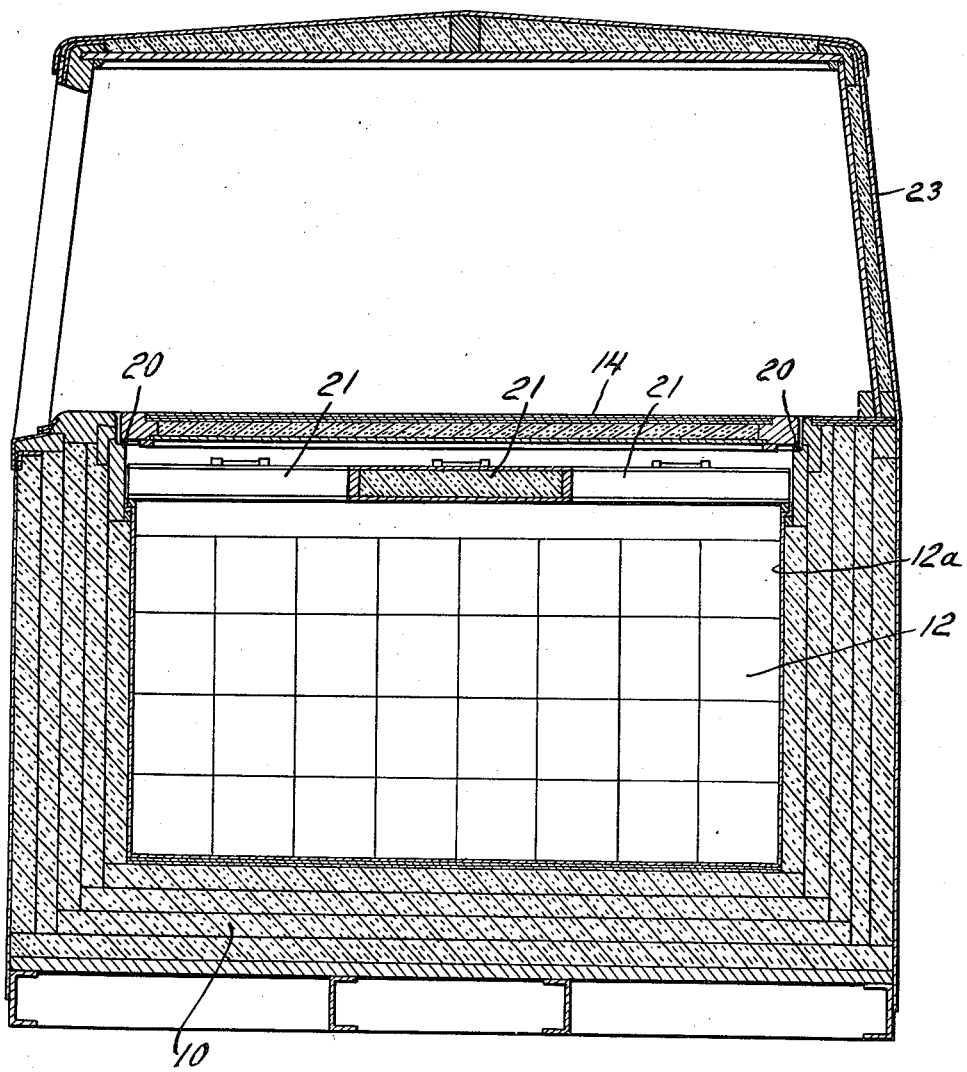
Figure 4 is a sectional view similar to Figure 3, but with the parts shown in detail.
Figure 5:
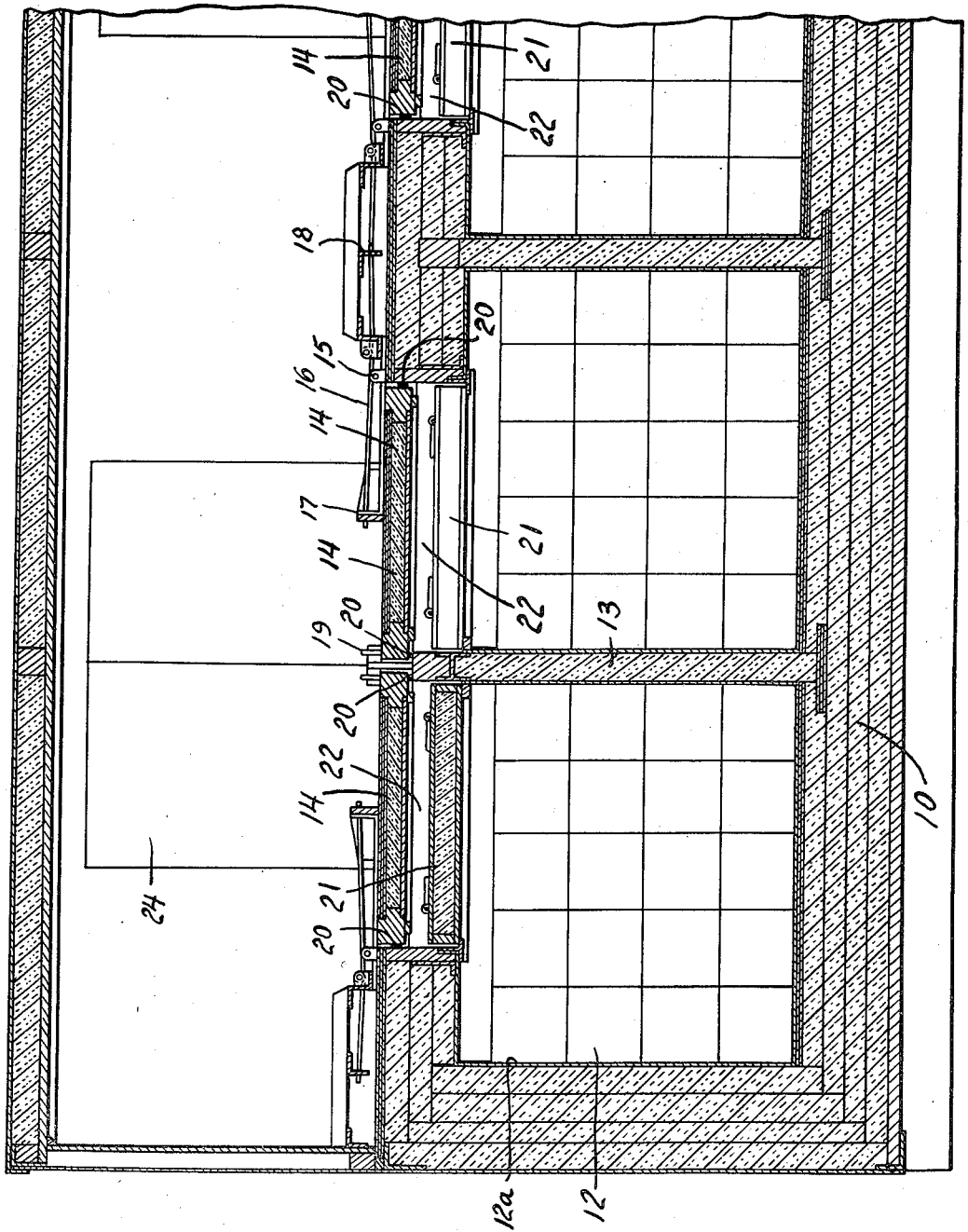
Figure 5 is a sectional view similar to Figure 1, but with the parts shown in detail.

Referring now to the drawings, the vehicle body illustrated is of a construction suitable for railway car use and it includes the customary under-frame (not shown), and end and side walls and roof of conventional construction. Within the body on the floor is an inner floor 10 built of a plurality of layers of insulating material, and the side and end walls of the body are provided with similar inner walls of insulation. The insulation along the side and end walls of the body extend upward to provide compartments 12 of the desired height, and in the body shown, there are eight such compartments arranged in a row lengthwise of the car. Each compartment extends entirely across the car, and successive compartments are separated by relatively thin partition walls 13 of insulating material. In order to obtain the maximum capacity of blocks of solid $CO_2$ while keeping the car body within the prescribed dimensions, the compartments are of a size such that they will hold eight blocks in a row across the car, five blocks in a row lengthwise of the car, and four blocks in a vertical row.

Each compartment 12 is provided with a lining 12a, and this lining is preferably made of thin sheet copper or galvanized iron with the seams soldered or brazed to make the lining gas-tight. At the top, the compartment is provided with a door 14 mounted to swing on a hinge 15 extending transversely of the car and supported on a suitable part of the top wall structure of the compartment. Each door is counterbalanced by means of springs 16, each of which has one end engaging a bracket 17 on the door, and the other engaging a fixed part of the top wall, such as the angle iron 18.

The compartments may be considered as arranged in pairs and the doors of the compartments of such a pair have their free edges resting upon the upper end of the partition wall 13 which separates the two compartments. The doors are held in position by latching means 19 of any conventional type mounted near the free edges of the doors, and bear against gaskets 20 interposed between the doors and the door frames.

The doors are made of insulating material and are of relatively light weight, so that they will not be cumbersome or difficult to handle. The additional insulation necessary for the top opening of each compartment is then provided by a member 21 of insulating material which lies in the top opening below the door, and is supported in any convenient manner to close the opening. Each insulating member, as illustrated in Figure 4, is made in three parts, each provided with handles so that when the door is opened, one or more of the parts may be removed to expose the contents of the compartment. These insulating members are of any suitable construction, as, for example, they may consist of a wooden framework with a top and bottom of insulating material such as that commercially known as Masonite and with cork board, kapok, or the like, as the filler. There is a gas space 22 between the door and the blanket, and this combination of the blanket, the gas space, and the door provide the necessary insulation for the top opening of the compartment.

With each compartment holding eight solid $CO_2$ blocks of standard size in a row across the car and the side walls of the car having the thick layers of insulation required, the top of the car would have a greater width than is permissible, if the side walls 23 were extended up vertically above the top of the compartments. On the other hand, if the compartments were made shorter, so as to permit the use of vertical side walls on the car body, there would be a substantial loss of capacity, since the length of such a compartment across the car can be varied only in units equal to a substantial part of the total capacity of the compartment. Accordingly, in the new car, the side walls above the tops of the compartments are inclined inwardly, as illustrated, and compartments of the maximum capacity are thus obtained without the car exceeding the clearance limitations In order to provide access to the interior of the body, doors 24 are provided in the portions of the side walls of the body above the tops of the compartments. These doors are preferably of the swinging type and they are arranged in pairs with the free edges of the doors meeting substantially in line with the partition walls 13 separating the compartments. In the car shown which has eight compartments, there are four pairs of doors in each side wall of the body above the top of the compartments, and on opening any pair of these doors, two compartments are accessible. For loading purposes, a pair of doors may be opened and a conveyor, such as that conventionally illustrated at 25, may be inserted into the car body, the conveyor discharging the blocks of solid $CO_2$, which are then stored in the compartments by workmen. Since these compartments are only four blocks high, a workman of average height may work in a compartment without encountering any difficulty from the evolved gas. When the compartments are to be unloaded, the contents are lifted out by the workmen, and then removed from the car in any suitable manner as, for example, by a conveyor similar to that designated 25 by operating in the reverse direction.

In a car of the construction illustrated and described, it will be observed that the insulation forming the bottom, the end and side walls, and the top of the compartments is a permanent part of the car structure, so that in effect, the car body may be considered as including a single permanent compartment which is divided into sub-compartments by the partition walls 13. Each of these sub-compartments is gas-tight except at the top, and has a single top opening closed by a door These doors swing on axes transverse to the car body, and the side walls of the body above the compartment are provided with doors in registry with the compartment doors. As a consequence, free access may be had to the subcompartments for loading and unloading. By constructing the sub-compartments to hold eight blocks in a row across the car, maximum capacity is obtained, and the car is kept within clearance limits by inclining its side walls inwardly above the top of the compartment, so that the transverse dimension of the roof is less than the transverse dimension of the floor. Another feature of practical importance in the new car is the use of relatively light weight doors and the blankets which provide the insulation omitted from the doors in order to make them easy to handle.

I claim:

1. A vehicle body which comprises a floor, side and end walls, a roof, layers of insulating material within the body covering the floor and extending up the walls for a portion of their height, a top within the body at the upper ends of the layers of insulating material along the walls and with the latter and the floor insulation defining a compartment extending substantially from end to end of the body, a plurality of spaced transverse partition walls in said compartment sub-dividing it into sub-compartments, said top having an opening for each sub-compartment, and a door in the top for closing each opening, said doors being arranged in pairs and swinging on transverse axes, and a side wall of the body having a plurality of openings spaced along the compartment, said openings being opposite and affording access respectively to each of said pairs of sub-compartment doors.

2. A vehicle body which comprises a floor, side and end walls, a roof, layers of insulating material within the body covering the floor and extending up the walls for a portion of their height, a top within the body at the upper ends of the layers of insulating material along the walls and with the latter and the floor insulating defining a compartment extending substantially from end to end of the body, a plurality of spaced transverse partition walls in said compartment sub-dividing it into sub-compartments, said top having an opening for each sub-compartment, and a door in the top for closing each opening, said doors being arranged in pairs swinging on transverse axes with the free edges of the doors of a pair lying above a partition wall, a side wall of the body having a plurality of openings spaced along the compartment, said openings being opposite and affording access respectively to each of said pairs of sub-compartment doors.

3. A vehicle body which comprises a floor, side and end walls, a roof, layers of insulating material within the body covering the floor and extending up the walls for a portion of their height, a top within the body at the upper ends of the layers of insulating material along the walls and with the latter and the floor insulation defining a compartment extending substantially from end to end of the body, a plurality of spaced transverse partition walls in said compartment sub-dividing it into sub-compartments, said top having an opening for each sub-compartment, the openings into the sub-compartments being arranged in pairs with each opening of a pair extending along the partition wall separating the sub-compartments corresponding to said openings, and a door for each of said openings, a side wall of the body having a plurality of openings spaced along the compartment, said openings being opposite and affording access respectively to the sub-compartment openings.

4. A vehicle body which comprises a floor, side and end walls, a roof, layers of insulating material within the body covering the floor and extending up the walls for a portion of their height, a top of insulating material within the body at the upper ends of the layers of insulating material along the walls and with the latter and the floor insulation defining a compartment extending the entire length of the body, a plurality of spaced transverse partition walls in said compartment sub-dividing it into sub-compartments, said top having an opening for each sub-compartment, and a closure for each opening comprising a removable member seated in the opening and a swinging door closing the opening and lying above said member, a side wall of the body having a plurality of openings spaced along the compartment and affording access to the sub-compartment openings.

5. A vehicle body which comprises a floor, side and end walls, a roof, layers of insulating material within the body covering the floor and extending up the walls for a portion of their height, a top of insulating material within the body below the roof and at the upper ends of the layers of insulating material along the walls, said top cooperating with the layers of insulating material along the walls and floor to define a compartment extending the entire length of the body, a plurality of spaced transverse partition walls in said compartment sub-dividing it into sub-compartments, said top having an opening for each sub-compartment, a door in the top for closing each opening, said doors being arranged in pairs and swinging on transverse axes, a side wall of the body having a plurality of openings spaced along the compartment above the top thereof, said openings being opposite and affording access respectively to each of said pairs of sub-compartment doors, the side walls of the body above the compartment converging inwardly to the side edges of the roof.

6. A container for solid carbon dioxide which comprises a bottom, side walls, and a top of insulating material, a vertical partition within said container sub-dividing it into a pair of compartments, said top having an opening along the upper end of said partition wall for entrance into each compartment, a door for each opening, said doors being swingingly mounted along their remote edges and having their free edges lying above said partition, horizontally-extending supports beneath said doors and insulating members removably mounted on said supports.

HOWARD A. SOMMERS.